R. D. KOHNE.
TRACTOR.
APPLICATION FILED MAY 22, 1918.
1,355,981.
Patented Oct. 19, 1920.
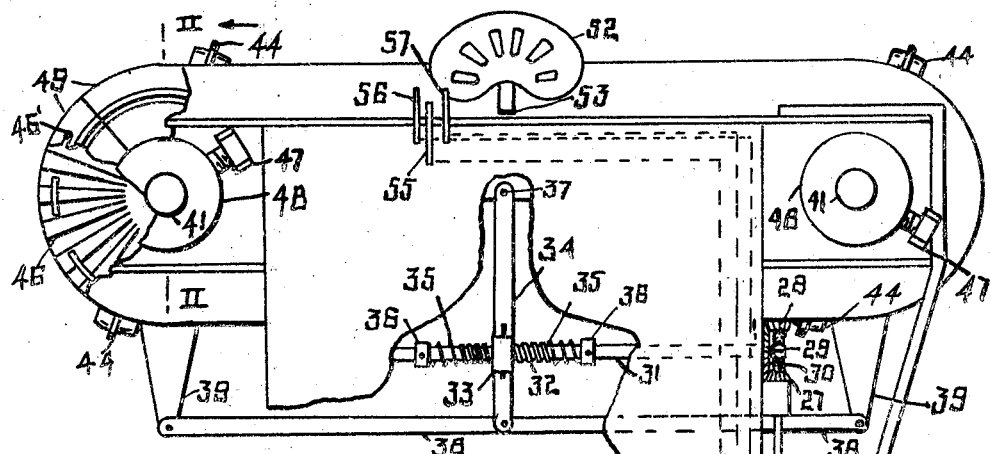
FIG. 1
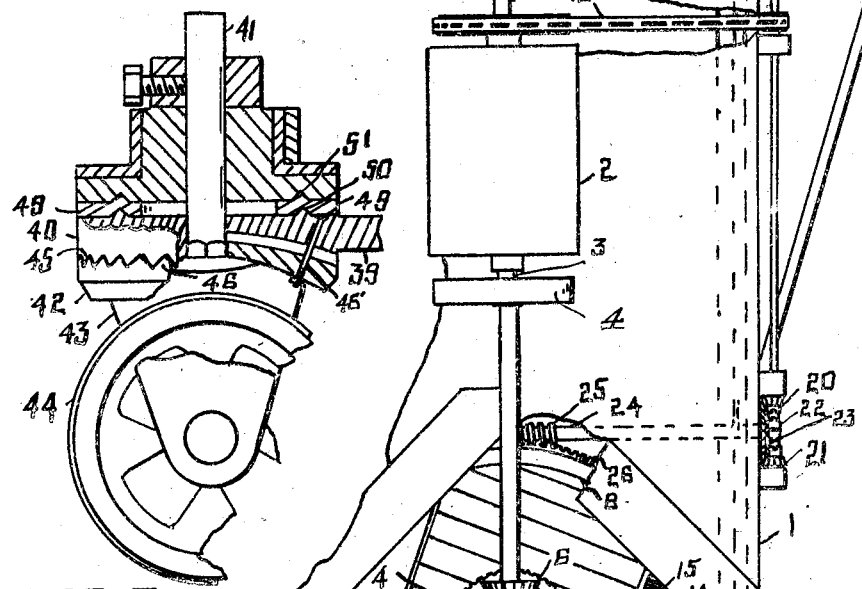
FIG. 2
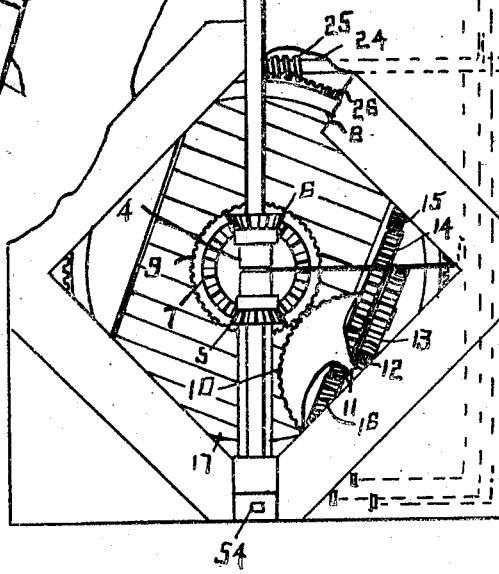
Robert D Kohne
INVENTOR
BY
ATTORNEY

UNITED STATES PATENT OFFICE.

ROBERT D. KOHNE, OF TOLEDO, OHIO.

TRACTOR.

1,355,981.  Specification of Letters Patent.  Patented Oct. 19, 1920.

Application filed May 22, 1918. Serial No. 235,918.

*To all whom it may concern:*

Be it known that I, ROBERT D. KOHNE, a citizen of the United States of America, residing at Toledo, Lucas county, Ohio, have invented new and useful Tractors, of which the following is a specification.

This invention relates to vehicle adjustment and control.

This invention has utility when incorporated in tractors, especially of the three-point support type, in rendering them more broadly adaptable to the varying conditions in farm work.

Referring to the drawings:

Figure 1 is a plan view, with parts broken away, of an embodiment of the invention in a tractor; and Fig. 2 is a section on the line II—II, Fig. 1.

The main frame 1, may carry centrally thereof the multiple cylinder internal combustion motor 2 having its shaft 3 connected by the clutch 4 for actuating pinion 5 for driving in one direction, and pinion 6 for driving in the opposite direction. These pinions 5, 6, are each in mesh with bevel gear 7 carried axially of the turn table or drum 8 providing the traction or propelling support for the tractor. Fast with the gear 7 is gear 9 in mesh with pinion 10, on vertical shaft 11, having worm 12 in mesh with worm wheel 13, fast with gear 14. The gear 14 is in mesh with gears 15, 16, actuating the wheels carrying the apron 17.

From the shaft 3 extends gearing 18 for rotating shaft 19, having toward the drum 8, a pair of pinions 20, 21, loosely mounted thereon, with sliding splined sleeve 22 therebetween for selectively clutching said pinions in effecting driving of bevel gear 23 in mesh therewith, thereby permitting steering of the tractor through the propelling support, for the gear 23 drives shaft 24 having worm 25 in mesh with the worm wheel teeth 26 on the drum 8.

The shaft 19 in its extent along the frame 1 away from the drum 8 carries loose bevel pinions 27, 28, selectively connected by splined sleeve 29 for driving bevel gear 30 fast on shaft 31. The shaft 31 has a central threaded portion 32 coacting with a nut 33 mounted against rotation thereon, but in its travel along shaft 31, moving the arm 34. The extent of the threaded portion 32 is such that the nut 33 soon travels free thereof, but in so doing it compresses one or the other of helical springs 35 held in position by collars 36. When the nut 33 rides free of the threaded portion 32, no further travel of the nut 33 occurs, but this is an automatic disconnection from power actuation; while immediately upon reversal of the power actuation, through connecting the other bevel pinion for driving the gear 30, the compressed spring 35 automatically shifts the nut 33 back upon the threaded portion 32 for reverse actuation of the nut 33.

The arm 34 which may be shifted by the nut 33, has a fixed fulcrum bearing 37 from which it swings to have its free end throw a link 38 terminally pivotally connected to arms 39 extending to plates 40 loosely mounted about caster pins 41. Each of these two pins 41 has fixed to its lower portion a plate 42 from which extend bracket portions 43 mounting a pair of caster wheels 44. Radially extending crowned flutings or corrugations 45 on the underside of arm carrying plate 40, interfit with similar flutings or corrugations 46 on the upper side of plate 42. By loosening bolt 46′ and set screw 47 mounting a collar 48 fast on the pin 41, the frame 1 may be lifted to permit relative angular adjustment or shifting of the caster wheel carrying plate 42 as to the steering arm carrying plate 40. The slots permit the bolt 46′ to be set for any angle of adjustment between these plates, and then drawing up of the bolt precludes any change in such adjustment, by holding the corrugations in mesh. This is a feature of especial utility in plowing with one caster wheel 44 in the plow furrow, thus making the tractor self-steering, for the caster wheel may be set for alining with the furrow and the furrow will tend to keep it from climbing out. Regardless of whether the casters or drum be leading, the drum apron and one caster wheel may line up to take a common row with the other caster laterally in a different row. To meet such a travel condition, the tractor may have a simple control of mean effect approximating that of travel at right angles to the line connecting the casters, for the mean direction of the arms 39 may be the same in each instance, due to adjustment between the plates 40, 42. With the frame load brought down on the adjusted plate 42, the angular position of the pin 41 as to the plate 40 is locked by the corrugations 45, 46, bolt 46′ coöperating, and the collar 48 brought down against the frame 1 may again be locked by the set screw 47.

A further unusual condition may be readily taken care of within the utility of the invention herein, and this is the maintenance of the frame 1 level in working over uneven ground. In the instance of working ground, as plowing, there is convenience in maintaining the plow in position with travel of one support in the furrow. With the apron or propelling support and one of the caster wheels traveling out of the furrow, the second caster wheel may travel in the furrow and the frame be leveled up by loosening the collar 48 and inserting one or two pairs of half ring sections 49 on the plate 40 to coact with a seat 50 of the fifth wheel bearing on the upper side of the plate 40, as well as with a seat 51 in the lower side of the frame 1. When ring sections 49 are used for each caster, in the leveling up, the sections may be taken from one and used to supplement those in the other.

The operator's seat 52 is removable from socket 53 at the caster wheel end of the frame 1 and insertible in a socket 54 at the propelling support end of the three-point supported tractor frame 1. In such change of position, hand lever 55 for controlling the clutch 4 is removable for socket insertion adjacent the changed seat. Likewise removable handle 56 positioning the clutch sleeve 29 as inactive or for steering the caster wheels 44 in either direction, may be placed with the seat 52 at its different position, with analogous change of coöperative relation for the removable hand lever 57 adapted for controlling the sleeve 22 from neutral to either direction of steering the drum 8. Accordingly at either direction of travel, all three steerable supports may be controlled similarly, oppositely and independently.

What is claimed and it is desired to secure by Letters Patent is:

1. A tractor including a frame having flare seats, supporting means for the frame including a pair of caster wheels, brackets for the wheels having flare heads coacting with the seats, and means for adjusting the effective caster length of the caster wheels permitting maintaining the frame level in operating the tractor over uneven ground and comprising means for varying the spacing of the heads and seats.

2. A tractor including a frame having seats, a frame supporting caster wheel operable in a furrow, a second frame supporting caster wheel operable above the furrow, brackets for the wheels having angular adjustment anchoring means coacting with the frame seats, and means for leveling the frame as to the wheels including removable means for varying the spacing of the brackets from the seats.

3. A tractor including a frame, a pair of frame supporting steerable caster wheels, operating arms for simultaneously controlling the steering of the wheels as to the frame, and means for adjusting the arms to different angles as to the wheels and frame for determining different mean straight line directions for tractor travel.

4. A tractor including a frame, a pair of supporting wheels therefor, a load carrying bracket for each wheel and connected to the frame, an arm for each wheel extending away from the load carrying bracket, and adjusting means for angularly shifting the arm as to the wheel for setting to position for steering operation of the wheels at a maximum leverage with the tractor frame travel general direction at different angles to the line connecting said wheels.

5. A tractor including a frame, a steerable caster wheel mounted in said frame, an operating arm for the wheel and coacting with the frame, and means for adjusting the angular position of the arm as to the wheel and frame for locating a mean position for the arm in straight line travel of the frame in various directions as to the frame.

6. A tractor including steerable wheels, and actuating mechanism for steering the wheels including an arm extending from each wheel, link means connecting the arms, a longitudinally fixed rotatable actuating shaft having a threaded portion, a collar on each side of said threaded portion, a compression spring about said shaft between each collar and the threaded portion, and a nut on the threaded portion and coacting with the link means in steering the wheels by shaft actuation, said threaded portion being of an extent precluding excessive cramping of the wheels in steering by allowing the nut to run off thereof, said nut being at once reset for opposite actuation of the wheels upon reverse travel of the shaft by the compression spring forcing the nut back upon the threaded portion.

7. A tractor including a pair of steerable caster wheels, and actuating mechanism for steering the wheels including a shaft having a threaded portion, a nut coacting with the threaded portion of the shaft for effecting steering actuation of the wheels, said nut having a travel range off said threaded portion, and means for causing the nut to return to the threaded portion upon reversal of shaft rotation.

8. A tractor, three supports therefor, one of which is a traveling apron, means for adjusting two of said supports for determining the general direction of the tractor travel and operating the third apron support for steering the tractor, and a motor for the tractor disposed on a line from the third support bisecting the line between the other two supports.

In witness whereof I affix my signature.

ROBERT D. KOHNE.